UNITED STATES PATENT OFFICE.

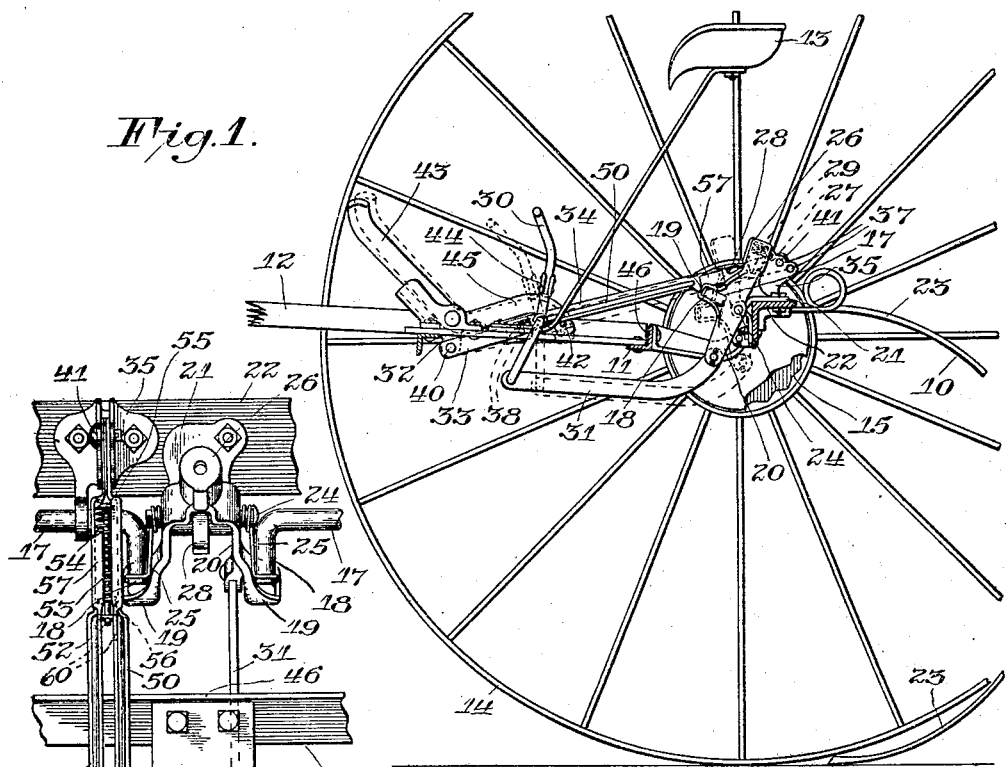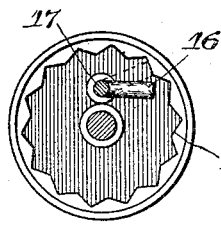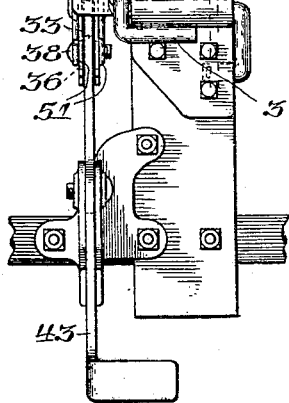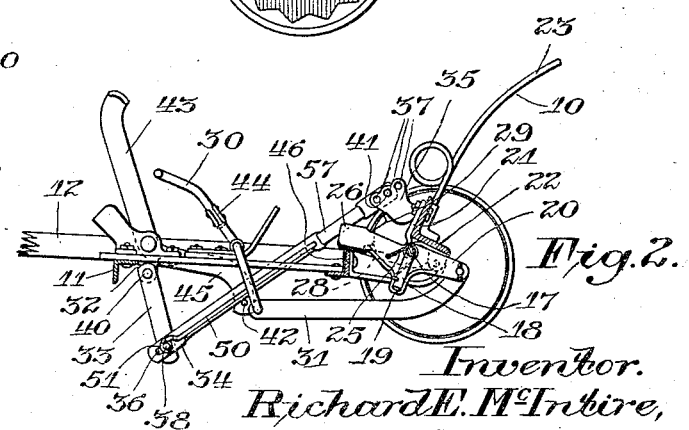

RICHARD E. McINTIRE, OF CHICAGO, ILLINOIS, ASSIGNOR TO INTERNATIONAL HARVESTER COMPANY OF NEW JERSEY, A CORPORATION OF NEW JERSEY.

RAKE.

1,278,181.  Specification of Letters Patent.  Patented Sept. 10, 1918.

Application filed December 8, 1915. Serial No. 65,684.

*To all whom it may concern:*

Be it known that I, RICHARD E. MCINTIRE, a citizen of the United States, residing at Chicago, in the county of Cook and State of Illinois, have invented certain new and useful Improvements in Rakes, of which the following is a full, clear, and exact specification.

This invention relates to rakes, and more particularly to control mechanism associated therewith.

One of the objects of this invention is to improve and simplify control mechanisms for hay rakes.

Another object is to overcome shocks given to the various parts of the rake upon the falling of the rake head and teeth from raised to lowered position.

Another object is to provide a simplified rake construction adapted to meet the various requirements for successful commercial operation.

These and other objects are accomplished by providing in a rake means for locking the rake in operative position, means for releasing the rake in operative position causing the same to be raised to inoperative position, means to release the rake in inoperative position permitting it to fall to operative position, and means for absorbing the shock of the fall of the rake.

The invention is illustrated on the accompanying sheet of drawings, in which—

Figure 1 is a fragmentary side elevation of a rake embodying my invention, with the rake teeth shown in operative position;

Fig. 2 is a fragmentary side elevation of the same rake, showing the rake teeth raised to inoperative position, with the control parts in a corresponding position;

Fig. 3 is a detail view showing the pawl and ratchet mechanism by means of which the rake head and teeth are raised; and Fig. 4 is a fragmentary plan view of the control mechanism of the rake showing the shock absorber in the connection between a stationary part of the main frame and the rake head.

The various novel features of my invention will be apparent from the following description and drawings, and will be particularly pointed out in the appended claims.

The invention is illustrated in connection with a rake 10, having a frame 11 provided with a draft connection 12 and an operator's seat 13, the rake being supported in the usual way by ground wheels 14 having formed in the hubs thereof a ratchet 15 adapted to be engaged by the usual pawls 16 formed on the ends of oppositely extending rods 17 having bent ends 18 engaging and retained in socket portions 19 of a casting 20 pivotally connected to a bracket 21 secured to the rake head 22. Secured to the under side of the rake head in any suitable manner are the usual rake teeth 23. The casting 20 and bracket 21 are pivotally connected by a pin 24, around the ends of which pass spring members 25 which press against the ends of the rods 17 in a manner permitting the pawls to ride over the teeth of the ratchet 15 when one or the other of the wheels moves rearwardly. Mounted in a thimble portion 26 of the casting 20 is a spring-pressed plunger 27 adapted to engage either of the two notches 28 or 29 formed in the top of the bracket 21. When the plunger 27 is in engagement with the notch 29, the pawls 16 are held out of engagement with the ratchet 15, but when the plunger is in engagement with the notch 28, the pawls are held in engagement with the ratchet 15 for the purpose of causing the rake head to be rotated and the rake teeth 23 to be raised under the influence of the forward movement of the ground wheels 14.

The position of the plunger 27, and thereby the control of the raising of the rake, is effected by a foot control lever 30 connected by a link 31 to the lower end of the pivotally mounted casting 20, in which the plunger 27 is mounted. As shown in full lines in Fig. 1, the plunger 27 is in engagement with the rear notch 29, the pawls 16 being held out of engagement with the ratchet 15, the rake teeth 23 being in their normal operative position for gathering hay. The rake head 22 and the rake teeth 23 are locked in this position by a collapsible connection between the rake head and a stationary part 32 of the frame, the connection including a link 33 pivoted to the stationary part 32 of the frame and a link 34 pivotally connected to a bracket 35 secured to the rake head 22. It will be noted that the free ends of the links 33 and 34 are pivotally connected together and the latter provided with an elongated slot 36 to permit of some play. For purposes of adjustment the casting 35 is provided with a series of openings 37, any one of which may be used for the pivotal connection btween the bracket 35 and the link 34.

As shown in Fig. 1 of the drawings, the pivotal point 38 between the links 33 and 34 is located above a straight line drawn between the point or center of connection 40 between the link 33 and the stationary part 32 of the frame, and the point of connection 41 between the link 34 and casting 35; in other words, the links 33 and 34 form a locking toggle connection. To prevent this toggle connection from collapsing due to jarring and the like, a pin 42 in the lower end of the foot lever 43 presses against the under side of the link 34 supporting the connection, the operator exerting the necessary pressure through the lever 43.

To avoid breakage of any of the parts, it is essential that the locking toggle connection be broken or collapsed before the pawls 16 are thrown into engagement with the ratchet 15 for raising the rake teeth. For this purpose I have provided an interlock between the pawl control lever 30 and the toggle connection, which interlock includes a projecting member 44 extending laterally from the foot lever 30 and adapted to force the lower end 45 of the lever 43 downwardly as the foot lever 30 is pressed forwardly for the purpose of throwing the pawl 16 into engagement with the ratchet 15; in other words, when the lever 30 is pushed forwardly from its full line position shown in Fig. 1, the projection 44 on the lever 30 presses against the cam portion of the arm 45 of lever 43, forcing said arm downwardly, and also the link 33 which is engaged by the arm 45, thereby collapsing or breaking the toggle connection and unlocking the rake teeth in their operative position. A continued forward movement of the lever 30 causes the plunger 27 to pass out of engagement with the notch 29 and into engagement with notch 28, the pawls 16 thereby, through the connections described, being forced into engagement with the ratchet 15, whereupon the rake head 22 is rotated and the rake teeth 23 raised as the ground wheels 14 move forwardly. The rake head 22 continues to rotate and the rake teeth 23 to rise until the thimble portion 26 of the casting 20 passes into engagement with the frame member 46, whereupon the plunger is thrown out of engagement with the notch 28 and snapped back into engagement with the notch 29, whereby the pawls 16 are thrown out of engagement with the ratchet 15, thereby permitting the rake teeth 23 to fall into operative position due to their own weight, the toggle locking connection automatically falling into locking position, as shown in full lines in Fig. 1.

The rake head and teeth in falling back into operative position, do so with considerable force, which would cause quite a jar to the various parts were some shock absorbing means not provided. I have provided shock absorbing means for the desired purpose, which shock absorbing means forms a part of the locking or toggle connection. More specifically stated, the means for absorbing shocks is located in the link member 34 connecting the link 33 with the casting 35 secured to the rake head 22. A U-shaped member 50 is mounted in the link 34 and is provided with eye portions 51 passing around the pivotal connecting pin 38 between the links 33 and 34, the opposite end of the U-shaped member 50 passing through a slotted portion 60 of the link 34 and being engaged by a hook 52 formed on one end of a rod 53, surrounding which is a coiled spring 54 interposed between the head 55 of the rod 53 and a shoulder portion 56 of a socket portion 57 of the link 34, said socket portion being pivotally connected to the casting 35 of the rake head 22. By means of this arrangement it is apparent that any shock due to the falling of the rake head and teeth from inoperative position to operative position will be absorbed by the spring 54 in the toggle connection, the length of the slot 36 in link 34 and the strength of the spring determining the degree of shock absorption.

It is apparent that there may be various modifications of the arrangement herein shown and described, and it is my intention to cover all such modifications which do not involve a departure from the spirit and scope of my invention.

What I claim as new is:

1. In a rake, the combination of a rake head, rake teeth secured thereto, a toothed member secured to said rake head, a member connected thereto having a plunger for engaging the teeth thereof to determine inoperative and operative rake actuating positions, a control member operatively connected to said plunger carrying member, and means for locking said rake head and teeth in operative position, said locking means being controlled as to its unlocking action by said control member.

2. In a rake, the combination of a rake head, rake teeth secured thereto, control means including a control lever whereby the rake head and teeth may be caused to be actuated, a locking connection for locking the rake head and teeth in operative position and being engageable by said control lever, and shock absorbing means in said connection for absorbing shocks on a lowering movement of said rake head and teeth.

3. In a rake, the combination of a frame, a rake head connected thereto, rake teeth secured to said rake head, locking means between said frame and rake head having means for absorbing shocks including a spring containing socket, and means for controlling said locking means.

4. In a rake, the combination of a frame, a rake head having teeth secured thereto, a locking link connection between said frame and rake head, a lever for holding the connection in locking position, a control lever for engaging said holding lever to collapse the link connection between said frame and rake head and means carried by said link connection for absorbing shocks.

5. In a rake, the combination of a frame, a rake head having teeth secured thereto, a locking link connection between said frame and rake head, a lever for holding the connection in locking position, a control lever for engaging said holding lever to collapse the link connection between said frame and rake head for permitting said rake teeth to be raised, and shock absorbing means in said link connection for absorbing shocks upon the lowering of said rake head and teeth.

In testimony whereof I affix my signature.

RICHARD E. McINTIRE.

Copies of this patent may be obtained for five cents each, by addressing the "Commissioner of Patents, Washington, D. C."